United States Patent [19]
Welles, II et al.

[11] Patent Number: 5,686,888
[45] Date of Patent: Nov. 11, 1997

[54] USE OF MUTTER MODE IN ASSET TRACKING FOR GATHERING DATA FROM CARGO SENSORS

[75] Inventors: Kenneth Brakeley Welles, II, Scotia; John Erik Hershey, Ballston Lake, both of N.Y.

[73] Assignee: General Electric Company, Schenectady, N.Y.

[21] Appl. No.: 484,753

[22] Filed: Jun. 7, 1995

[51] Int. Cl.6 .................. G08B 1/08; H04B 1/00
[52] U.S. Cl. .............. 340/539; 340/825.49; 340/825.54; 340/825.07; 340/991; 340/825.36; 455/54.1; 455/53.1; 455/12.1; 364/132; 342/457
[58] Field of Search .................. 340/539, 991, 340/992, 825.49, 825.54, 825.07–825.13, 825.69, 825.72, 825.36; 455/11.1, 9, 12.1, 13.1, 54.1, 53.1, 56.1, 33.1; 342/457; 379/59; 364/132

[56] References Cited

U.S. PATENT DOCUMENTS

| | | | |
|---|---|---|---|
| 4,742,357 | 5/1988 | Rackley | 342/457 |
| 4,750,197 | 6/1988 | Denekamp et al. | 340/825.35 |
| 4,897,642 | 1/1990 | DiLullo et al. | 340/825.54 |
| 4,918,425 | 4/1990 | Greenberg et al. | 340/539 |
| 5,014,206 | 5/1991 | Scribner et al. | 342/457 |
| 5,225,842 | 7/1993 | Brown et al. | 342/357 |
| 5,355,511 | 10/1994 | Hatano et al. | 455/11.1 |
| 5,379,224 | 1/1995 | Brown et al. | 364/449 |

FOREIGN PATENT DOCUMENTS 09415413  12/1993  WIPO.

*Primary Examiner*—Donnie L. Crosland
*Attorney, Agent, or Firm*—Marvin Snyder

[57] ABSTRACT

The condition and/or integrity of goods is monitored while in transit using a local area network of tracked assets. Autonomous electronic sensors are situated in proximity to the cargo being shipped. These sensors communicate with an asset tracking unit affixed to the container for the goods via a mutter mode transceiver. The tracking unit has the ability to relay the cargo sensor data to the central station on demand, on exception, or on a predetermined schedule established by the central station. Communication between the cargo sensors and the tracking unit may be one-way (i.e., sensor to tracking unit) or two-way. Multiple sensors may communicate with each tracking unit.

12 Claims, 5 Drawing Sheets

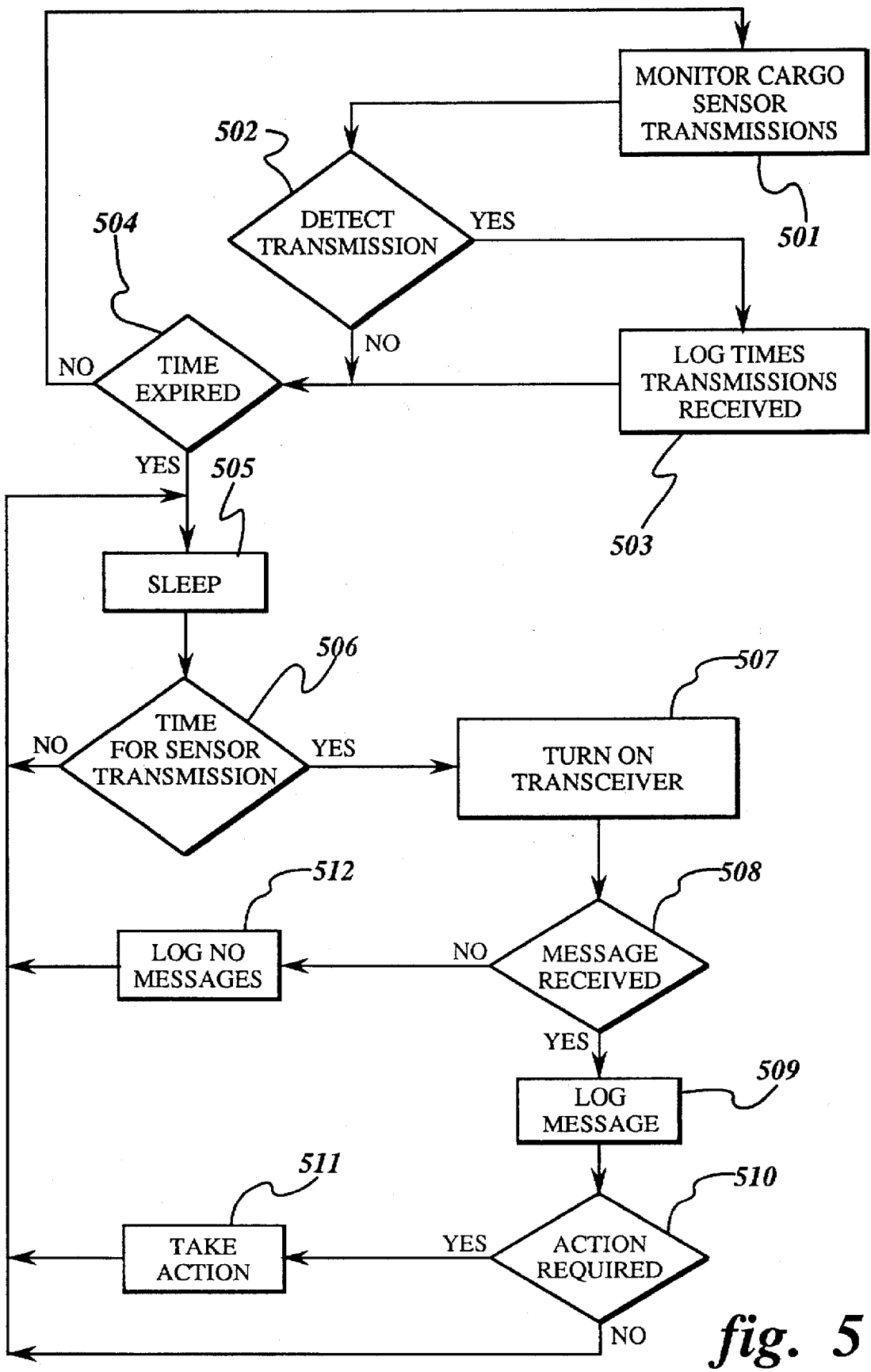

USE OF MUTTER MODE IN ASSET TRACKING FOR GATHERING DATA FROM CARGO SENSORS

BACKGROUND OF THE INVENTION

1. Field of the Invention

This invention relates to asset tracking and, more particularly, to tracking of assets, including goods and vehicles, using the Global Positioning System (GPS). The invention is an enhancement to such asset tracking system which, in addition to reporting location, reports the condition and integrity of goods being shipped.

2. Background Description

Goods shipped from a manufacturing plant, warehouse or port of entry to a destination are normally tracked to assure their timely and safe delivery. Tracking has heretofore been accomplished in part by use of shipping documents and negotiable instruments, some of which travel with the goods and others of which are transmitted by post or courier to a receiving destination. This paper tracking provides a record which is completed only on the safe delivery and acceptance of the goods. However, during transit, there sometimes is a need to know the location of the goods. Knowledge of the location of goods can be used for inventory control, scheduling and monitoring.

Shippers have provided information on the location of goods by tracking their vehicles, knowing what goods are loaded on those vehicles. Goods are often loaded aboard shipping containers or container trucks, for example, which are in turn loaded aboard railcars. Various devices have been used to track such vehicles. In the case of railcars, passive radio frequency (RF) transponders mounted on the cars have been used to facilitate interrogation of each car as it passes a way station and supply the car's identification. This information is then transmitted by a radiated signal or land line to a central station which tracks the locations of cars. This technique, however, is deficient in that whenever a particular railcar remains on a siding for an extended period of time, it does not pass a way station. Moreover, way station installations are expensive, requiring a compromise that results in way stations being installed at varying distances, depending on the track layout. Thus, the precision of location information varies from place to place on the railroad.

Recently, mobile tracking units have been used for tracking various types of vehicles, such as trains. Communication has been provided by means of cellular mobile telephone or RF radio link. Such mobile tracking units are generally installed aboard the locomotive which provides a ready source of power. However, in the case of shipping containers, container truck trailers and railcars, a similar source of power is not readily available. Mobile tracking units which might be attached to containers and vehicles must be power efficient in order to provide reliable and economical operation. Typically, a mobile tracking unit includes a navigation set, such as a Global Positioning System (GPS) receiver or other suitable navigation set, responsive to navigation signals transmitted by a set of navigation stations which may be either space-based or earth-based. In each case, the navigation set is capable of providing data indicative of the vehicle location based on the navigation signals. In addition, the mobile tracking unit may include a suitable electromagnetic energy emitter for transmitting to a remote location the vehicle's location data and other data acquired from sensing elements on board the vehicle. Current methods of asset localization require that each item tracked be individually equipped with hardware which determines and reports location to a central station. In this way, a tracked asset is completely "ignorant" of other assets being shipped or their possible relation to itself. In reporting to the central station, such system requires a bandwidth which scales approximately with the number of assets being reported. The aggregate power consumption over an entire such system also scales with the number of assets tracked. Further, since both the navigation set and the emitter are devices which, when energized, generally require a large potion of the overall electrical power consumed by the mobile tracking unit, it is desirable to control the respective rates at which such devices are respectively activated and limit their respective duty cycles so as to minimize the overall power consumption of the mobile tracking unit.

Most current asset tracking systems are land-based systems wherein a radio unit on the asset transmits information to wayside stations of a fixed network, such as the public land mobile radio network or a cellular network. These networks do not have ubiquitous coverage, and the asset tracking units are expensive. A satellite-based truck tracking system developed by Qualcomm Inc., known as OMNITRACS, is in operation in the United States and Canada. This system requires a specialized directional antenna and considerable power for operation while vehicle location, derived from two satellites, is obtained with an accuracy of about one-fourth kilometer. Burns et al. U.S. Pat. No. 5,129,605 describes a rail vehicle positioning system installed on the locomotive of a train and which uses, as inputs to generate a location report, a GPS receiver, a wheel tachometer, transponders, and manual inputs from the locomotive engineer.

In an asset tracking system disclosed in U.S. applications Ser. No. 08/484,150 entitled "Local Communication Network for Power Reduction and Enhanced Reliability in a Multiple Node Tracking System" by Welles et al. and in U.S. application Ser. No. 08/487,272 entitled "Protocol and Mechanism for Primary and Mutter Mode Communication for Asset Tracking" by Ali et al., both filed concurrently herewith, assigned to the instant assignee and incorporated herein by reference, a tracking system based on a "mutter" mode local area network is used to generate data which are transmitted to a central station. In this asset tracking system, there are two modes of communication. One mode is communication between the central station and the tracking units, which is usually via satellite. The second mode is a local area network, referred to as the "mutter" mode, between tracking units. One of the mobile units, denoted the master unit, communicates with the central station. While this asset tracking system provides a reliable and accurate system for tracking assets in transit, there are situations when the condition and/or integrity of the goods being shipped also needs to be monitored. Such goods may be temperature or shock sensitive or have a particularly high intrinsic value.

SUMMARY OF THE INVENTION

It is therefore an object of the present invention to provide a way of monitoring the condition and/or integrity of goods in transit using a local area network of tracked assets.

According to the present invention, autonomous electronic sensors are affixed to or contained within the cargo being shipped. These sensors communicate with the asset tracking unit via a mutter mode transceiver of the type described in the aforementioned Welles et al. and Ali it al. applications. The tracking unit has the ability to relay the cargo sensor data to the central station on demand, on exception, or on a predetermined schedule established by the central station. Communication between the cargo sensors and the tracking unit may be one-way (i.e., sensor to tracking unit) or two-way. Multiple sensors may communicate with each tracking unit.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

FIG. 5 is a flow diagram showing the process by which a tracking unit detects a sensor transmission and relays messages to the central station in the asset tracking system shown in FIG. 1.

DETAILED DESCRIPTION OF A PREFERRED EMBODIMENT OF THE INVENTION

Figure 1:
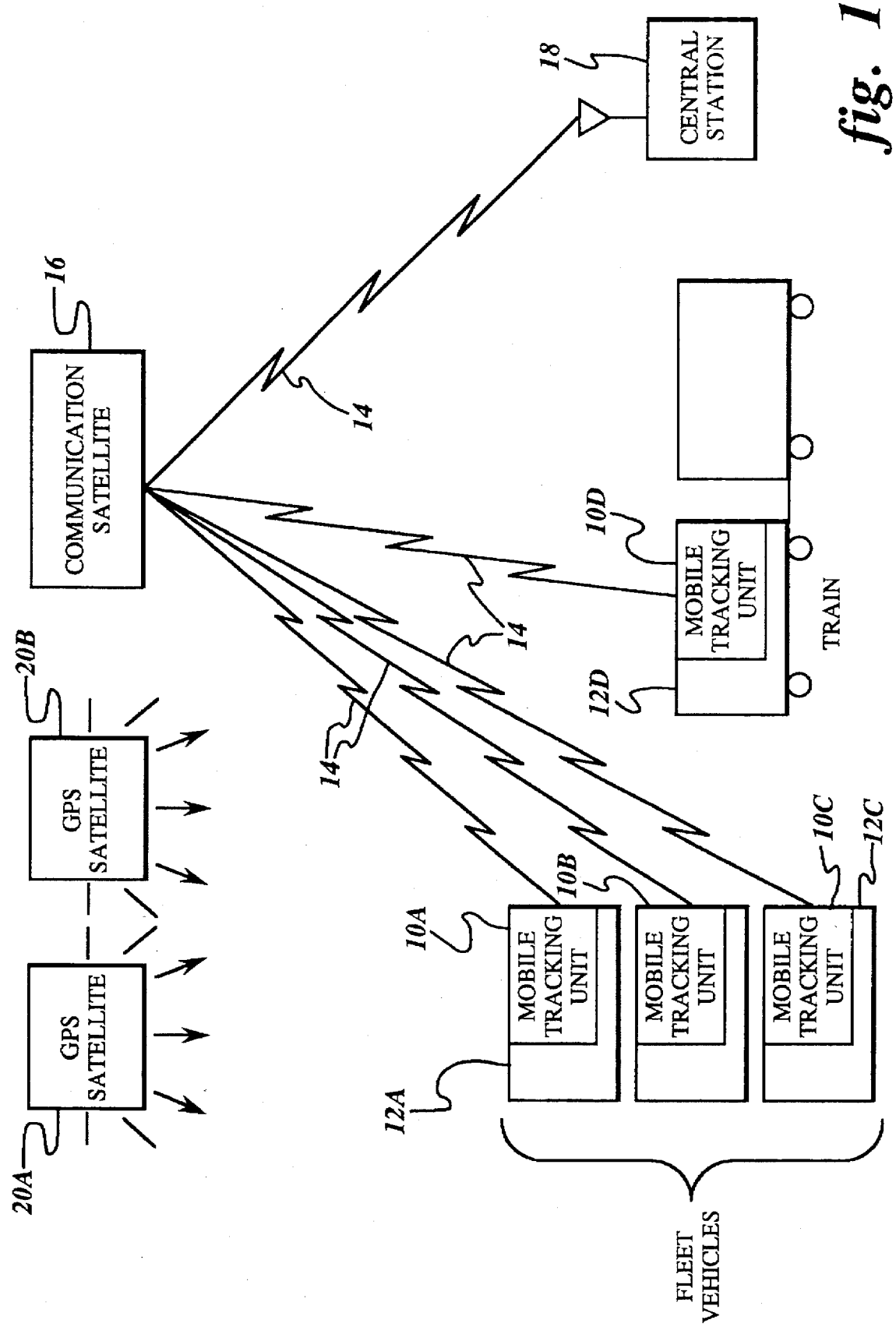
FIG. 1 is a block diagram of an exemplary asset tracking system which employs mobile tracking units and operates in accordance with the method of the instant invention.

FIG. 1 illustrates mobile tracking units which employ navigation signals from a GPS satellite constellation, although, as suggested above, other navigation systems can be used in lieu of GPS. A set of mobile tracking units 10A–10D are installed in respective cargo-carrying vehicles 12A–12D, which are to be tracked or monitored. A communication link 14, such as a satellite communication link through a communication satellite 16, can be provided between each mobile tracking unit (hereinafter collectively designated 10) and a remote central station 18 manned by one or more operators and having suitable display devices and the like for displaying location and status information for each vehicle equipped with a respective mobile tracking unit. Communication link 14 can be conveniently used for transmitting vehicle conditions or events measured with suitable sensing elements. Communication link 14 may be one-way (from mobile tracking units to remote central station) or two-way. In a two-way communication link, messages and commands can be sent to the tracking units, thereby further enhancing reliability of the communication. A constellation of GPS satellites, such as 6PS satellites 20A and 20B, provides highly accurate navigation signals which can be used to determine vehicle location and velocity when the signals are acquired by a suitable GPS receiver.

Briefly, the GPS was developed by the U.S. Department of Defense and gradually placed into service throughout the 1980s. The GPS satellites constantly transmit radio signals in L-Band frequency using spread spectrum techniques. The transmitted radio signals carry pseudorandom sequences which allow users to determine location on the surface of the earth (within approximately 100 feet), velocity (within about 0.1 MPH), and precise time information. GPS is a particularly attractive navigation system to employ, being that the respective orbits of the GPS satellites are chosen so as to provide world-wide coverage and being that such highly-accurate radio signals are provided free of charge to users by the U.S. government.

Figure 2:
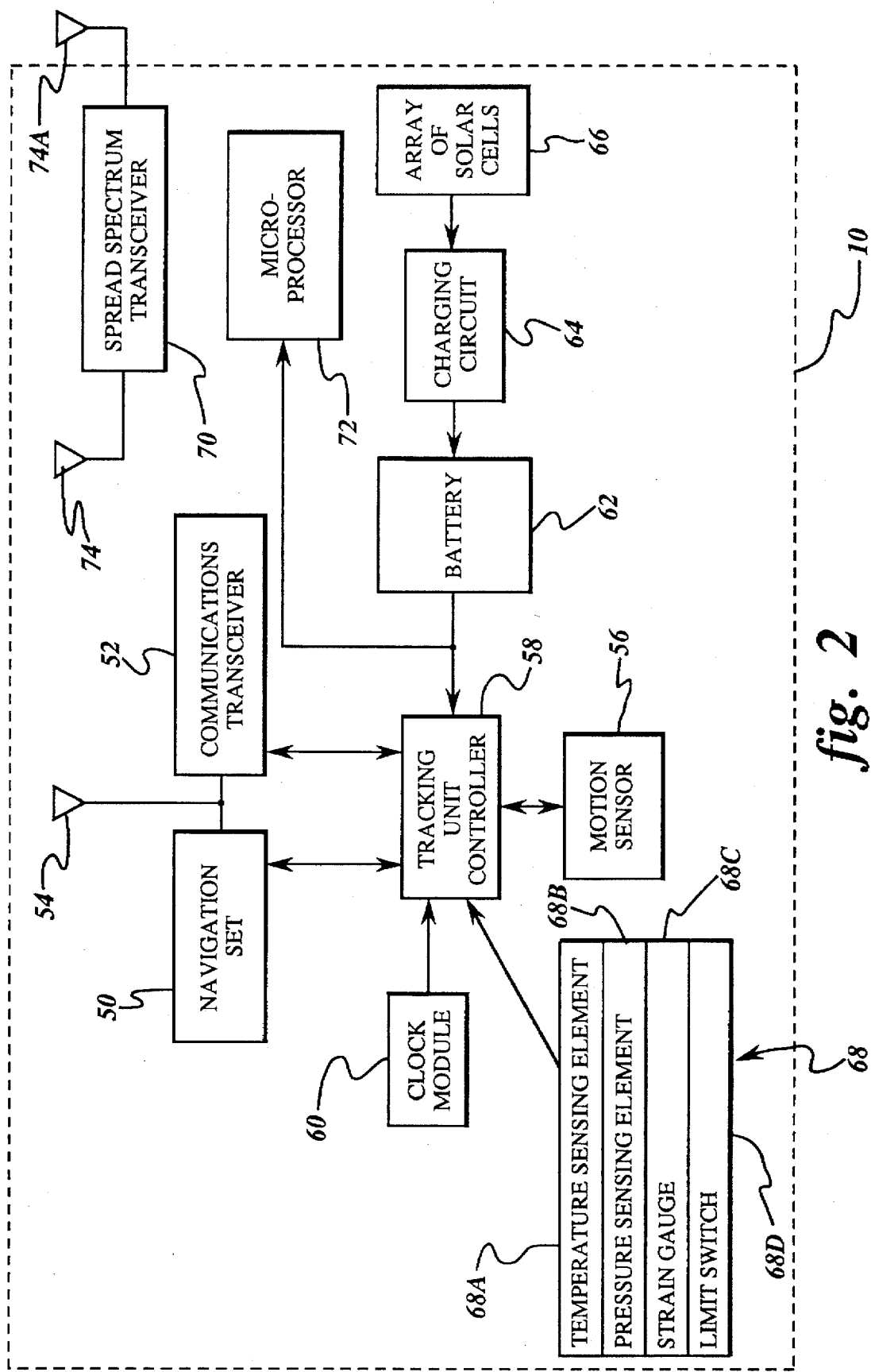
FIG. 2 is a block diagram showing in further detail a mobile tracking unit as used in the asset tracking system shown in FIG. 1.

FIG. 2 is a block diagram of a mobile tracking unit 10 which includes a navigation set 50 capable of generating data substantially corresponding to the vehicle location. Choice of navigation set depends on the particular navigation system used for supplying navigation signals to any given mobile tracking unit. Preferably, the navigation set is a GPS receiver such as a multichannel receiver; however, other receivers designed for acquiring signals from a corresponding navigation system may alternatively be employed. For example, depending on the vehicle location accuracy requirements, the navigation set may comprise a Loran-C receiver or other such less highly-accurate navigation receiver than a GPS receiver. Further, the navigation set may conveniently comprise a transceiver that inherently provides two-way communication with the central station and avoids the need for separately operating an additional component to implement such two-way communication. Briefly, such transceiver would allow for implementation of satellite range measurement techniques whereby the vehicle location is determined at the central station simply through use of range measurements to the vehicle and the central station from two satellites whose position in space is known. The need for power by either such navigation set imposes a severe constraint for reliable and economical operation of the mobile tracking unit aboard vehicles which typically do not carry power supplies (e.g., shipping containers, railcars used for carrying freight, truck trailers, etc.). Typical GPS receivers currently available generally require as much as two watts of electrical power for operation. For the GPS receiver to provide a location fix, the receiver must be energized for a some minimum period of time in order to acquire sufficient signal information from a given set of GPS satellites so as to generate a navigation solution. A key advantage of the present invention is the ability to substantially reduce the energy consumed by the mobile tracking unit by selectively reducing the activation or usage rate for the navigation set and other components of the mobile tracking unit. In particular, if, while the vehicle is stationary, the activation rate for the navigation set is reduced, then the energy consumed by the mobile tracking unit can be substantially reduced, for example, by a factor of at least one hundred.

Mobile tracking unit 10 includes a communications transceiver 52 functionally independent from navigation set 50. If the navigation set comprises a transceiver, the function of transceiver 52 can be performed by the transceiver of the navigation set. Both communications transceiver 52 and navigation set 50 are actuated by a controller 58, which receives clock signals from a clock module 60. Transceiver 52 is capable of transmitting the vehicle location data by way of communication link 14 (FIG. 1) to the central station and receiving commands from the central station by way of the same link. If a GPS receiver is used, the GPS receiver and the transceiver can be conveniently integrated as a single unit for maximizing efficiency of installation and operation. An example of one such integrated unit is the Galaxy InmarsatC/GPS integrated unit, which is available from Trimble Navigation, Sunnyvale, Calif., and is conveniently designed for data communication and position reporting between the central station and the mobile tracking unit. A single, low profile antenna 54 can be used for both GPS signal acquisition and satellite communication.

A low power, short distance radio link permits joining the nearby tracking units in a network to minimize power and maintain high reliability and functionality of such network. As shown in FIG. 2, in addition to a power source 62 (which comprises a battery pack that can be charged by an array of solar cells 66 through a charging circuit 64), a GPS receiver 50, a communications transceiver 52, and various system and vehicle sensors 68A–68D, each tracking unit includes a low power local transceiver 70 and a microprocessor 72. Microprocessor 72 is interfaced to all of the other elements of the tracking unit and has control over them. Transceiver 70 may be a commercially available spread spectrum transceiver such as those currently utilized in wireless local area networks. Spread spectrum transceiver 70 is equipped with its own low profile antenna 74.

Figure 3:
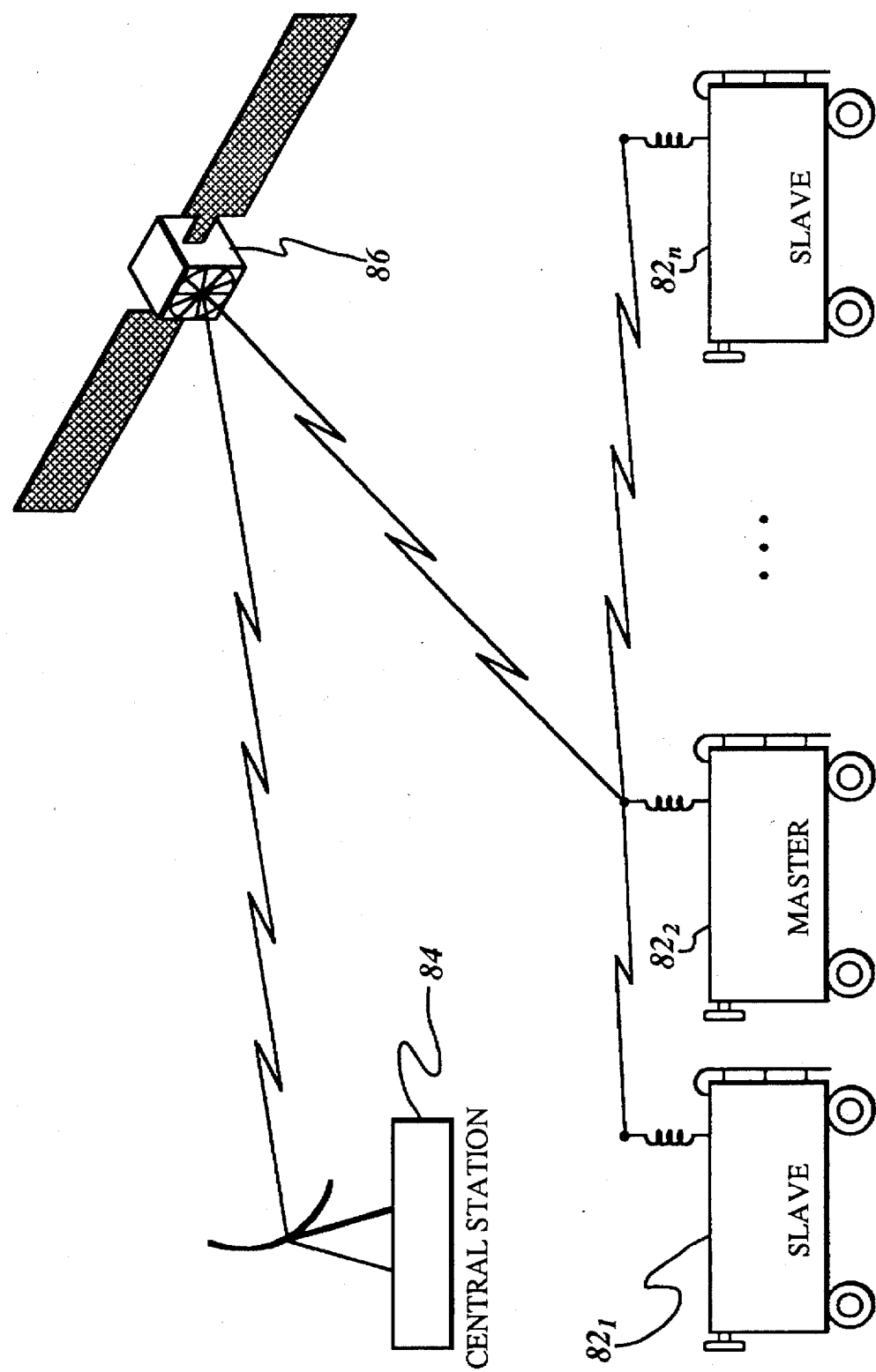
FIG. 3 is a block diagram illustrating organization of the mobile local area network implemented by the asset tracking system.

Utilizing local transceiver 70, microprocessor 72 communicates with all other tracking units within communications range, forming a dynamically configured local area network (LAN), herein after called a "mutter network". Such mutter network is generally shown in FIG. 3. When a train has multiple freight cars $82_1, 82_2, \ldots, 82_n$ equipped with these tracking units of the type shown in FIG. 3, all of these units will exchange information. Because each microprocessor is interfaced to the power source of its own respective tracking unit, the status of available power for each tracking unit can also be exchanged. Once this information is available, then the unit with the most available power (i.e., most fully charged batteries) will become the designated master, the other tracking units being slaves. The master tracking unit performs the GPS location and velocity reception function, assembles these data along with the identification (IDs) of all other tracking units on the wain, and transmits this information periodically in a single packet to a central station 84 via communication satellite 86.

Figure 4:
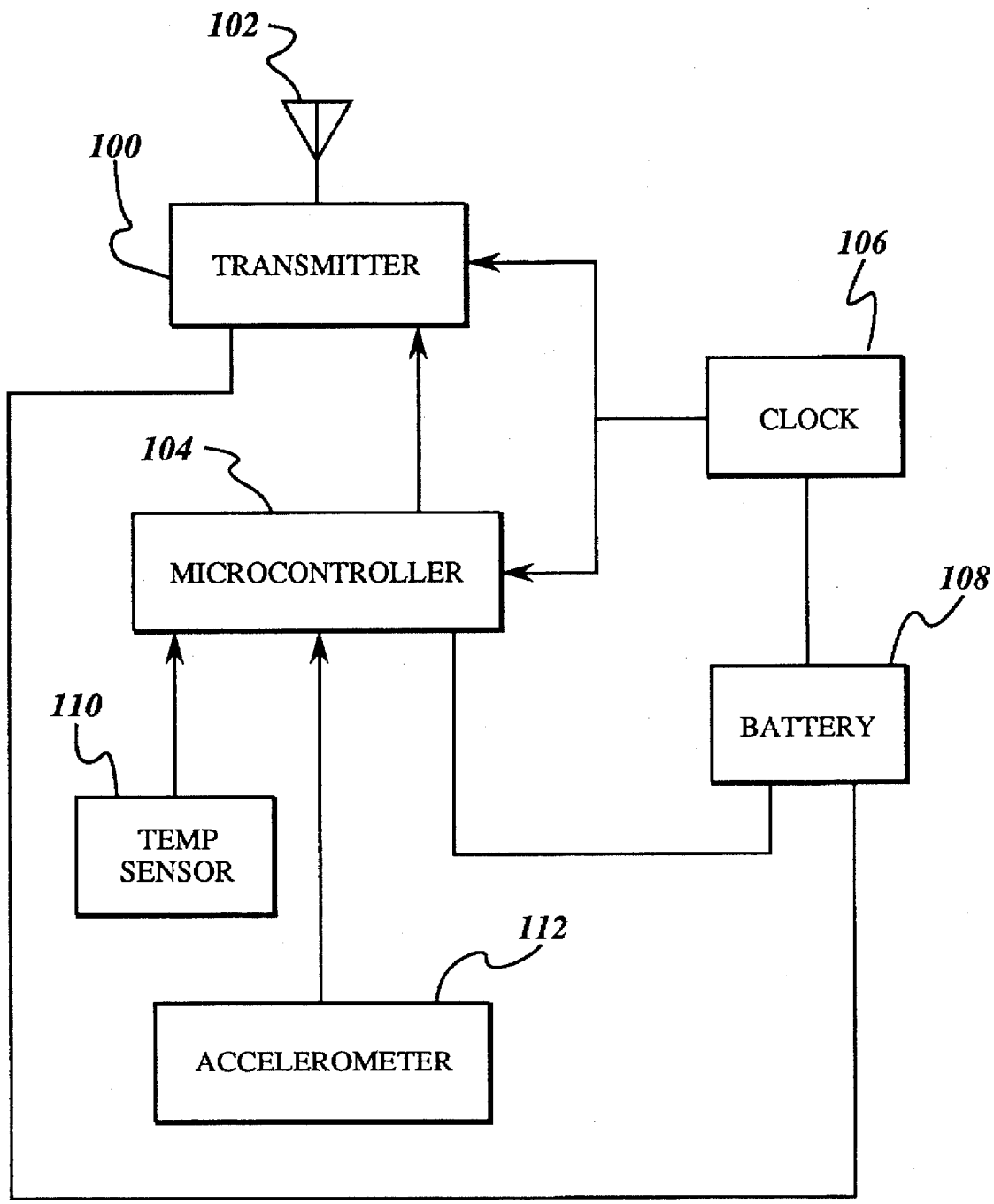
FIG. 4 is a block diagram of a sensor employed on a cargo carrier in the asset tracking system shown in FIG. 1.

A sensor of the type which is placed in or on the goods to be monitored is shown in block diagram form in FIG. 4. The basic circuitry comprises a transmitter 100 coupled to an antenna 102, a microcontroller 104, and a clock 106 which triggers the transmitter to transmit data on a periodic basis, for example every fifteen minutes. The clock, microcontroller and transmitter are all powered by a battery 108. Coupled to microcontroller 104 are one or more environmental sensors such as, for example, a temperature sensor 110 and an accelerometer 112 for monitoring respectively temperature and shocks to which the goods are subjected in transit. The output signals of the environmental sensors are supplied to microcontroller 104, which provides suitable analog-to-digital conversion of the signals and formatting of the data for transmission by transmitter 100. The signal radiated by antenna 102 is received by antenna 74 (FIG. 2) of the tracking unit.

The sensors shown in FIG. 4 may each be two-way devices, in which case transmitter 100 is replaced with a transceiver. This allows the tracking unit to poll microcontroller 104 for the current status of the goods. Such poll may be initiated by the central station, for example, or the tracking unit may be programmed to poll the sensor on a periodic basis.

The monitored data for all classes of goods are not the same. For some goods, temperature is a critical environmental factor, and temperature sensor 110 is therefore provided. For goods which are highly sensitive to shocks, accelerometer 112 is provided. For goods having an intrinsically high value, a serial number for the goods may be reported as a monitor of the integrity of the goods. The serial number may be programmed into an electronically programmable mad only memory (EPROM) in microcontroller 104 at the time of shipment when the sensor is affixed to, or otherwise positioned with respect to, the goods. No matter what data are to be reported, the basic construction of the sensor may be a highly integrated design which is inexpensive to manufacture in quantity.

When affixing a tracking unit to the outside of a metal container, such as a railcar, truck trailer or intermodal container, a small hole is made through the container wall, just behind the tracking unit. An auxiliary antenna 74a (FIG. 2), small enough to fit through this hole in the container wall, is passed through the hole to the inside of the container. The tracking unit may be constructed in either of two different ways to utilize this auxiliary antenna. Either both of auxiliary internal antenna 74a and external antenna 74 are continuously connected to spread spectrum transceiver 70, or microprocessor 72 switches between the two antennas during different access modes.

Several types of standard sensors may be employed, the temperature and shock sensors being but examples. Transmission of a serial number, which can be done independently or in conjunction with transmission of sensed environmental conditions, provides a form of moving inventory (or loss control) for each piece of cargo. This results in a complete tally of which cargo is actually within the container, from the time when it is loaded until the time when it is removed.

A customer requests the type of service desired by communicating with the central station. Based on the type of service requested, the central station transmits a message to the tracking unit carded by the container that places the tracking unit into the operational mode that will provide the requested services for the duration of the shipment. One mode of operation might be to monitor all transmitted temperature signals. If any cargo temperature should rise above or fall below the thresholds supplied by the customer, an immediate or a scheduled report of this fact is made, as determined by customer request. Another mode of operation might be to tally all cargo serial numbers within a container and report them to the central facility when the container starts moving (e.g., at initiation of shipment). Whenever the cargo serial numbers should happen to stop being reported, their removal from the internal tally would also be reported. This would allow the central station to provide computerized tracking of individual pieces of cargo to shippers or receivers on a real-time basis.

Because sensors placed in the cargo are desirably small and inexpensive, they are battery powered, preferably with very low average power consumption. The asset tracking units are under similar low power constraints. To minimize total power consumed by both sensor and tracker, a scheduling or communication between sensor and tracking unit is performed, as illustrated in the flow diagram of FIG. 5. The tracking unit has a highly accurate clock which allows microprocessor 74 (FIG. 2) to be energized at a predetermined time. Each sensor is set to transmit its signal every fifteen minutes (for example), and the burst of data from the sensor will last for 0.1 second. Each successive transmission from the sensor will occur fifteen minutes after the previous one, with a possible error of 0.3 seconds. During cargo loading, or at a command from the central station, the tracking unit monitors, or "listens to" the cargo sensors continuously for more than fifteen minutes. This is illustrated in FIG. 5 at step 501 and is accomplished by turning on the receiver portion of the tracking unit's transceiver 70 (FIG. 2). When transmissions from the sensor are received, as detected at decision step 502, the exact times of arrival of all signals from the cargo sensors are recorded by the tracking unit at step 503. A test is made at decision block 504 to determine if the time period for listening for cargo sensor transmissions has expired. If not, the process loops back to step 501 to listen for more transmissions. When the time for listening for cargo sensor transmissions has expired, the list recorded at step 503 is complete, and the tracking unit goes into a standby or "sleep" mode at step 505.

For the duration of the shipment, the tracking unit remains in the "sleep" mode until 0.5 seconds before the next scheduled cargo sensor message. This time is detected at step 506 and, at that time, the internal mutter mode spread spectrum transceiver 70 (FIG. 2) is turned on at step 507. A test is made at decision step 508 to determine if the cargo sensor message has been received. If so, its time of arrival is logged for the schedule to energize the tracking unit for the next message at step 509. Any action required by the message just received is taken at decision step 510, and then the tracking unit is again placed in a "sleep" mode by looping back to step 505 to reduce power consumption. If a scheduled message is not received, this is logged in at steps 511 before the process loops back to function block 505.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A method of tracking and gathering data from cargo sensors comprising the steps of:

affixing a tracking unit to each respective container of cargo to be tracked;

situating an environmental sensor in proximity to goods in at least some of the containers to which tracking units are affixed, each of the sensors transmitting an environmental condition sensed at periodic intervals;

monitoring, at each tracking unit for a first predetermined period of time, transmissions from a specific one of said environmental sensors situated in proximity to the goods in a specific container to which said each tracking unit is affixed;

logging, at said each tracking unit, times of reception of transmissions from said environmental sensors;

thereafter, monitoring, at said each tracking unit for a second predetermined period of time centered on logged times, transmissions from the specific one of said environmental sensors; and recording, at said each tracking unit, data transmitted by the specific one of said environmental sensors.

2. The method of tracking and gathering data from cargo sensors recited in claim 1 including the additional step, after logging times of reception of transmissions from said environmental sensors, of halting monitoring of transmissions from the specific one of said environmental sensors until said logged times.

3. The method of tracking and gathering data from cargo sensors recited in claim 2 and further comprising the steps of:

detecting, at said each tracking unit, transmissions received from the specific one of said environmental sensors during said logged times; and recording, at said each tracking unit, messages contained in the detected transmissions.

4. The method of tracking and gathering data from cargo sensors recited in claim 3 and further comprising the step of recording at said each tracking unit a failure to detect a message during a logged time for the specific one of said environmental sensors.

5. The method of tracking and gathering data from cargo sensors recited in claim 3 and further comprising the step of transmitting recorded messages to a central station.

6. The method of tracking and gathering data from cargo sensors recited in claim 5 wherein said recorded messages are transmitted to said central station on a periodic basis.

7. The method of tracking and gathering data from cargo sensors recited in claim 5 wherein said recorded messages are transmitted to said central station when said each tracking unit is polled by the central station.

8. The method of tracking and gathering data from cargo sensors recited in claim 5 wherein said recorded messages are transmitted to said central station immediately upon receipt when an exception condition is detected.

9. The method of tracking and gathering data from cargo sensors recited in claim 1 and further comprising the steps of:

forming at least one dynamic mobile local area network comprising a plurality of tracking units, each of the tracking units in the local area network being a node of the network;

assigning one of the tracking units in the local area network to be a master tracking unit, other tracking units in the local area network assuming a role of slave tracking units; and transmitting from only the master tracking unit data from all nodes of the local area network to the central station.

10. The method of tracking and gathering data from cargo sensors recited in claim 1 wherein said environmental sensor comprises a temperature sensor.

11. The method of tracking and gathering data from cargo sensors recited in claim 1 wherein said environmental sensor comprises a shock sensor.

12. The method of tracking and gathering data from cargo sensors recited in claim 1 wherein transmissions from the environmental sensor include an identification number associated with the goods in the container to which the tracking unit is affixed.

* * * * *